United States Patent
Kano et al.

(10) Patent No.: US 11,792,663 B2
(45) Date of Patent: Oct. 17, 2023

(54) MOBILE TERMINAL TEST APPARATUS, MOBILE TERMINAL TEST SYSTEM, AND CONTROL METHOD FOR MOBILE TERMINAL TEST APPARATUS

(71) Applicant: ANRITSU CORPORATION, Kanagawa (JP)

(72) Inventors: Daiki Kano, Kanagawa (JP); Yuki Naruse, Kanagawa (JP); Keiichi Mineda, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 185 days.

(21) Appl. No.: 17/235,393

(22) Filed: Apr. 20, 2021

(65) Prior Publication Data

US 2021/0337407 A1 Oct. 28, 2021

(30) Foreign Application Priority Data

Apr. 27, 2020 (JP) ................................ 2020-078035

(51) Int. Cl.
| | |
|---|---|
| H04L 5/00 | (2006.01) |
| H04W 88/08 | (2009.01) |
| H04L 43/50 | (2022.01) |
| H04L 43/045 | (2022.01) |
| H04W 24/06 | (2009.01) |
| H04W 24/00 | (2009.01) |

(52) U.S. Cl.
CPC ........... *H04W 24/06* (2013.01); *H04W 24/00* (2013.01)

(58) Field of Classification Search
CPC .............................. H04W 24/00; H04W 24/06
See application file for complete search history.

(56) References Cited

U.S. PATENT DOCUMENTS

2018/0343574 A1* 11/2018 Basedahl .............. H04W 24/06
2018/0343575 A1* 11/2018 Ogawa .............. H04W 72/0453

FOREIGN PATENT DOCUMENTS

| JP | 6080924 A | 2/2017 |
|---|---|---|
| JP | 2017055236 A * | 3/2017 |
| JP | 2018-032945 A | 3/2018 |

* cited by examiner

*Primary Examiner* — Jeffrey M Rutkowski
*Assistant Examiner* — Christopher Nguyen
(74) *Attorney, Agent, or Firm* — Pearne & Gordon LLP

(57) ABSTRACT

Provided is a mobile terminal test apparatus, which is capable of visualizing a correspondence between a plurality of component carriers and a plurality of signal processing units. Provided is a mobile terminal test apparatus including: a plurality of signal processing units; a pseudo base station unit; a test control unit; and a display unit, the test control unit displays, on the display unit, a path image having a first area in which information indicating the plurality of CCs is displayed, a second area in which information indicating the plurality of signal processing units is displayed, and a third area in which information indicating a correspondence between the plurality of CCs displayed in the first area and the plurality of signal processing units displayed in the second area is displayed.

7 Claims, 9 Drawing Sheets

MOBILE TERMINAL TEST APPARATUS, MOBILE TERMINAL TEST SYSTEM, AND CONTROL METHOD FOR MOBILE TERMINAL TEST APPARATUS

TECHNICAL FIELD

The present invention relates to a mobile terminal test apparatus, a mobile terminal test system, and a control method for a mobile terminal test apparatus.

BACKGROUND ART

In the related art, for example, a mobile terminal test apparatus which tests a mobile terminal by associating a plurality of component carriers in carrier aggregation with a plurality of call processing units according to a multiplexing method to communicate with the mobile terminal has been proposed in Patent Document 1.

RELATED ART DOCUMENT

Patent Document

[Patent Document 1] Japanese Patent No. 6080924

DISCLOSURE OF THE INVENTION

Problem that the Invention is to Solve

However, the mobile terminal test apparatus in the related art as described above has a problem that it is not possible to visualize the correspondence between a plurality of component carriers and a plurality of call processing units (hereinafter, referred to as "signal processing units").

The present invention has been made to solve such a problem, and an object of the present invention to provide a mobile terminal test apparatus, a mobile terminal test system, and a control method for a mobile terminal test apparatus, which are capable of visualizing the correspondence between a plurality of component carriers and a plurality of signal processing units.

Means for Solving the Problem

A mobile terminal test apparatus according to the present invention is a mobile terminal test apparatus (1) including: a plurality of signal processing units ($12a$ to $12d$) that process signals for communication with a mobile terminal (2); a pseudo base station unit (10) that functions as a base station for the mobile terminal; a test control unit (14) that controls the pseudo base station unit; and a display unit (15), the mobile terminal test apparatus testing the mobile terminal by using signals input or output from the plurality of signal processing units by associating a plurality of component carriers with the plurality of signal processing units, based on parameters which are set for each of the plurality of component carriers in carrier aggregation, in which the test control unit displays, on the display unit, a path image having a first area (31) in which information indicating the plurality of component carriers is displayed, a second area (32) in which information indicating the plurality of signal processing units is displayed, and a third area (33) in which information indicating a correspondence between the plurality of component carriers displayed in the first area and the plurality of signal processing units displayed in the second area is displayed.

With this configuration, the mobile terminal test apparatus according to the present invention displays information indicating a correspondence between the plurality of component carriers and the plurality of signal processing units, on the display unit, thereby visualizing the correspondence between the plurality of component carriers and the plurality of signal processing units.

In the mobile terminal test apparatus according to the present invention, the test control unit may be configured to display, in the first area, as information indicating the plurality of component carriers, first-type figures of the number obtained by multiplying the number of component carriers according to a carrier aggregation standard by the number of antennas for each component carrier, display, in the second area, as information indicating the plurality of signal processing units, second-type figures respectively corresponding to the plurality of signal processing units, and display in the third area, as information indicating the correspondence between the plurality of component carriers displayed in the first area and the plurality of signal processing units displayed in the second area, line segments connecting the first-type figures and the second-type figures.

With this configuration, the mobile terminal test apparatus according to the present invention displays information indicating a correspondence between the antennas of each component carrier and the plurality of signal processing units, on the display unit, thereby visualizing the correspondence between the antennas of each component carrier and the plurality of signal processing units.

Further, in the mobile terminal test apparatus according to the present invention, the plurality of signal processing units each may have a plurality of ports ($20a$ to $20c$), and the test control unit may be configured to display the path image such that a port used among the plurality of ports is distinguished from other ports.

With this configuration, the mobile terminal test apparatus according to the present invention displays information indicating a correspondence between the plurality of component carriers and the ports of the plurality of signal processing units, on the display unit, thereby visualizing the correspondence between the plurality of component carriers and the ports of the plurality of signal processing units.

A mobile terminal test system according to the present invention is a mobile terminal test system including: a mobile terminal test apparatus (1) which includes a plurality of signal processing units ($12a$ to $12d$) that process signals for communication with a mobile terminal (2), and a pseudo base station unit (10) unit that functions as a base station for the mobile terminal, and tests the mobile terminal by using signals input or output from the plurality of signal processing units, by associating a plurality of component carriers with the plurality of signal processing units, based on parameters which are set for each of the plurality of component carriers in carrier aggregation; and a test control apparatus (4) which controls the mobile terminal test apparatus, in which the test control apparatus includes a test control unit (14) that controls the pseudo base station unit, and a display unit (15), and the test control unit displays, on the display unit, a path image having a first area (31) in which information indicating the plurality of component carriers is displayed, a second area (32) in which information indicating the plurality of signal processing units is displayed, and a third area (33) in which information indicating a correspondence between the plurality of component carriers displayed in the first area and the plurality of signal processing units displayed in the second area is displayed.

With this configuration, the mobile terminal test system according to the present invention displays information indicating a correspondence between the plurality of component carriers and the plurality of signal processing units, on the display unit, thereby visualizing the correspondence between the plurality of component carriers and the plurality of signal processing units.

A control method for a mobile terminal test apparatus according to the present invention is a control method for a mobile terminal test apparatus (1) which includes a plurality of signal processing units (12a to 12d) that process signals for communication with a mobile terminal (2), a pseudo base station unit (10) that functions as a base station for the mobile terminal, a test control unit (14) that controls the pseudo base station unit, and a display unit (15), and tests the mobile terminal by using signals input or output from the plurality of signal processing units by associating a plurality of component carriers with the plurality of signal processing units, based on parameters which are set for each of the plurality of component carriers in carrier aggregation, the method including the test control unit to display, on the display unit, a path image having a first area (31) in which information indicating the plurality of component carriers is displayed, a second area (32) in which information indicating the plurality of signal processing units is displayed, and a third area (33) in which information indicating a correspondence between the plurality of component carriers displayed in the first area and the plurality of signal processing units displayed in the second area is displayed.

In the control method for a mobile terminal test apparatus according to the present invention, the test control unit may display, in the first area, as the information indicating the plurality of component carriers, first-type figures of the number obtained by multiplying the number of component carriers according to a carrier aggregation standard by the number of antennas for each component carrier, display, in the second area, as the information indicating the plurality of signal processing units, second-type figures respectively corresponding to the plurality of signal processing units, and display, in the third area, as the information indicating the correspondence between the plurality of component carriers displayed in the first area and the plurality of signal processing units displayed in the second area, line segments connecting the first-type figures and the second-type figures.

Further, in the control method for a mobile terminal test apparatus according to the present invention, the plurality of signal processing units each may have a plurality of ports (20a to 20c), and the test control unit may display the path image such that a port used among the plurality of ports is distinguished from other ports.

As described above, in the control method for the mobile terminal test apparatus according to the present invention, information indicating a correspondence between the plurality of component carriers and the plurality of signal processing units is displayed on the display unit, thereby visualizing the correspondence between the plurality of component carriers and the plurality of signal processing units.

Advantage of the Invention

The present invention can provide a mobile terminal test apparatus, a mobile terminal test system, and a control method for a mobile terminal test apparatus, which are capable of visualizing the correspondence between a plurality of component carriers and a plurality of signal processing units.

BRIEF DESCRIPTION OF THE DRAWINGS

FIG. 3A is a conceptual diagram which shows a frequency of a component carrier, and FIG. 3B is a diagram which shows an example of a path image.

FIG. 4A is a conceptual diagram which shows a frequency of a component carrier, and FIG. 4B is a diagram which shows an example of a path image.

FIG. 5A is a conceptual diagram which shows a frequency of a component carrier, and FIG. 5B is a diagram which shows an example of a path image.

FIG. 7A is a conceptual diagram which shows a frequency of a component carrier, and FIG. 7B is a diagram which shows an example of a path image.

BEST MODE FOR CARRYING OUT THE INVENTION

Hereinafter, a mobile terminal test system according to an embodiment of the present invention will be described in detail with reference to the drawings.

In the embodiment of the present invention, an example in which the mobile terminal test apparatus according to the present invention is applied to a mobile terminal test apparatus that tests a mobile terminal conforming to the standard specifications of 5th Generation New Radio (5G NR) which is a 5G wireless system will be described.

A Carrier Aggregation technology is introduced in the standard specifications of 5G NR.

This carrier aggregation is a technology for improving the transmission speed by performing communication using a plurality of carriers at the same time.

In carrier aggregation, communication is performed using a plurality of carriers called component carriers (hereinafter, also referred to as "CC").

In carrier aggregation, communication is performed by one primary component carrier (hereinafter, also referred to as "PCC"), which is a CC required for a mobile communication terminal to maintain a connection with a base station, and one or more secondary component carriers (hereinafter, also referred to as "SCC") which are CCs used to improve the transmission speed between the mobile communication terminal and the base station.

Further, the mobile terminal test apparatus according to the embodiment of the present invention supports Multiple-Input and Multiple-Output (MIMO) in which both the transmitting side and the receiving side perform communication by using a plurality of antennas. That is, the mobile terminal test apparatus according to the embodiment of the present invention can reproduce a state in which each CC is transmitted from a plurality of antennas.

Figure 1:
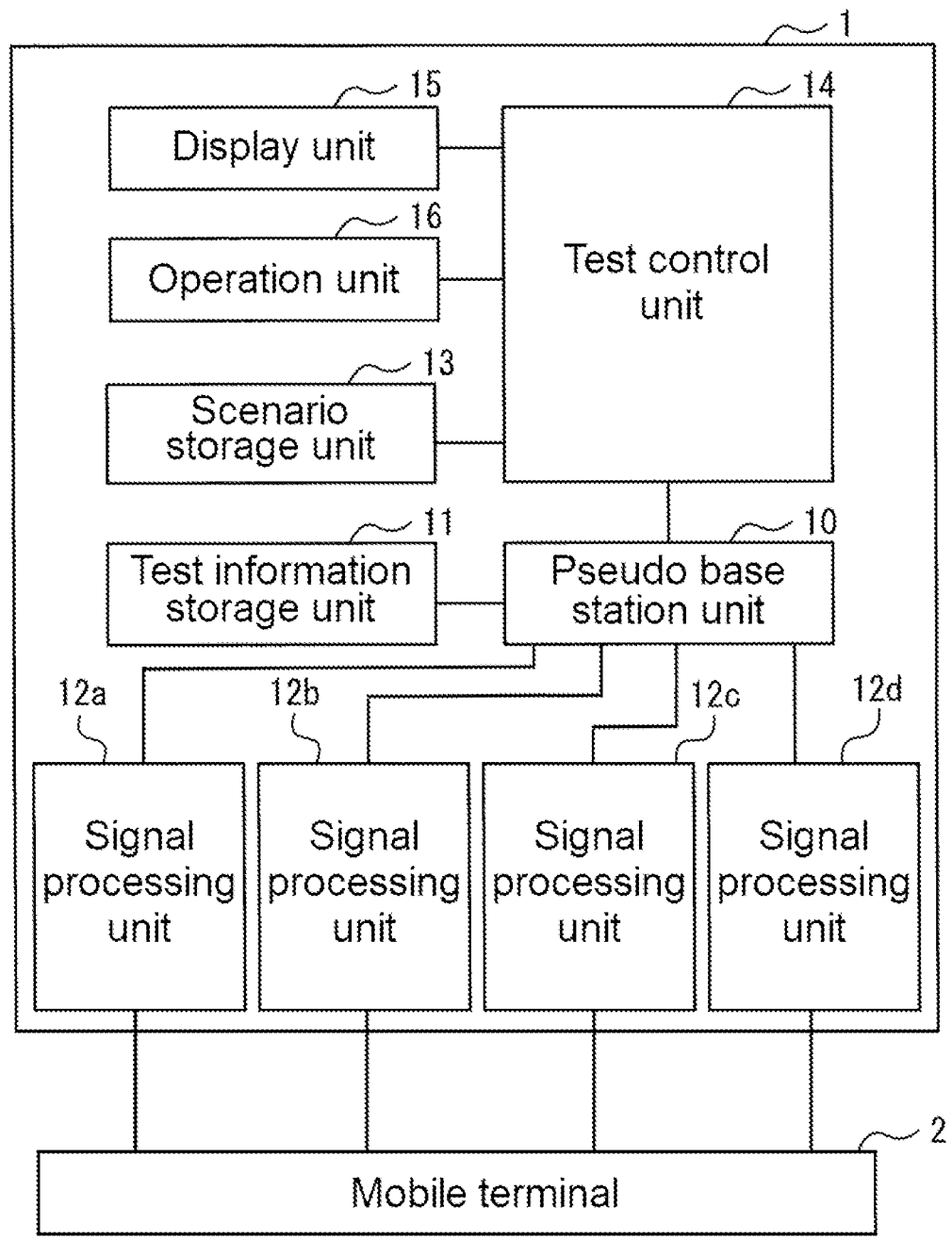
FIG. 1 is a block diagram of a mobile terminal test apparatus according to an embodiment of the present invention.

In FIG. 1, the mobile terminal test apparatus 1 transmits and receives signals to and from the mobile terminal 2 by wire via a coaxial cable or the like. Further, as will be described later, the mobile terminal test apparatus 1 can wirelessly transmit and receive signals to and from the mobile terminal 2 via an external antenna apparatus.

The mobile terminal test apparatus 1 includes a pseudo base station unit 10 that functions as a base station for the mobile terminal, a test information storage unit 11 that stores test information including parameters for controlling the pseudo base station unit 10, signal processing units 12a to 12d that process signals for communication with a mobile terminal 2, a scenario storage unit 13 that stores information including a scenario for executing the test of the mobile terminal 2, a test control unit 14 that controls the pseudo base station unit 10, based on the information stored in the scenario storage unit 13, a display unit 15, and an operation unit 16.

Further, FIG. 1 shows an example in which four signal processing units 12a to 12d (hereinafter, also collectively referred to as "signal processing unit 12") are provided in the mobile terminal test apparatus 1, but the number of signal processing units 12 provided in the mobile terminal test apparatus 1 is not limited. The signal processing unit 12 is detachably provided with respect to the mobile terminal test apparatus 1. Therefore, the number of signal processing units 12 provided in the mobile terminal test apparatus 1 can be changed.

The mobile terminal test apparatus 1 is composed of a computer apparatus. This computer apparatus includes a Central Processing Unit (CPU) (not shown), a Read Only Memory (ROM), a Random Access Memory (RAM), a hard disk device, and a communication module.

A program for making the computer apparatus function as the mobile terminal test apparatus 1 is stored in the ROM and the hard disk device of the computer apparatus. That is, when the CPU executes the program stored in the ROM, with the RAM as the work area, the computer apparatus functions as the mobile terminal test apparatus 1.

The pseudo base station unit 10 and the test control unit 14 are composed of CPUs.

The test information storage unit 11 and the scenario storage unit 13 are composed of a RAM or a hard disk device. The signal processing unit 12 is composed of a communication module.

The display unit 15 is composed of an image display device such as a liquid crystal display, and displays an image for inputting information, an image showing a state under test, and the like. The operation unit 16 is composed of an input device such as a keyboard, a mouse, and a touch pad. For example, the display unit 15 and the operation unit 16 are composed of touch panels.

Figure 2:
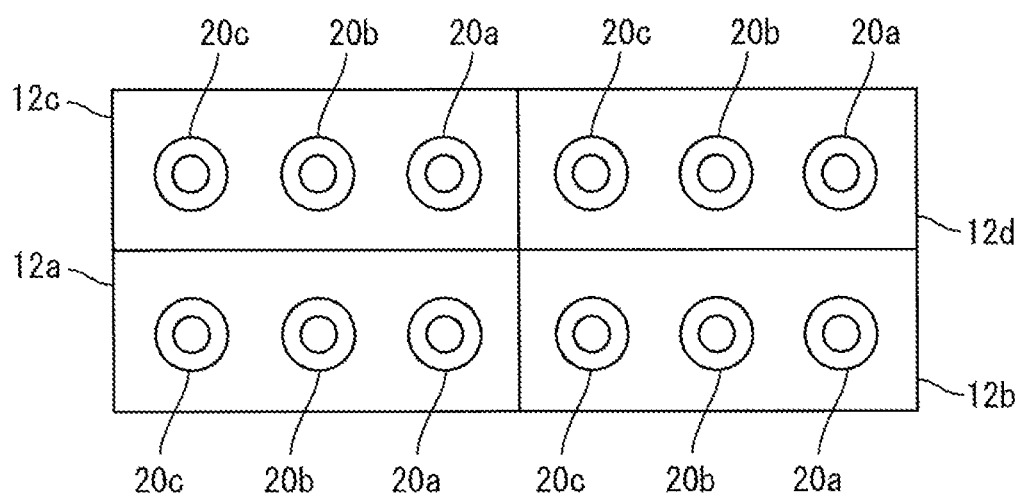
FIG. 2 is a schematic view showing a first example of a port of a signal processing unit constituting the mobile terminal test apparatus according to the embodiment of the present invention.

In the present embodiment, each of the signal processing units 12a to 12d has three ports 20a to 20c as shown in FIG. 2. The ports used by the signal processing units 12a to 12d are selected from among the ports 20a to 20c.

In addition, FIG. 2 shows an example in which each of the signal processing units 12a to 12d has three ports 20a to 20c, but the number of ports possessed by each of the signal processing units 12a to 12d is not limited.

In the present embodiment, the port 20a constitutes an input/output port corresponding to a frequency band of 6 GHz or 12 GHz or less. The signal input to the port 20a and the signal output from the port 20a are combined by a coupler in each of the signal processing units 12a to 12d.

The port 20b constitutes an output port corresponding to a frequency band of 6 GHz or 12 GHz or less. Since the signal output from the port 20b does not pass through the coupler like the signal output from the port 20a, the maximum value of the output level of the port 20b is higher than the maximum value of the output level of the port 20a.

The port 20c corresponds to a high frequency band of 20 GHz or more by passing through an RF converter. For example, when transmitting and receiving signals to and from the mobile terminal 2 wirelessly, an external antenna apparatus built in the chamber is connected to the port 20c by passing through an RF converter.

The correspondence between the plurality of CCs, the plurality of signal processing units 12, and the plurality of ports of each signal processing unit 12 is stored in the test information storage unit 11. The correspondence stored in the test information storage unit 11 is set by the test control unit 14 based on the information stored in the scenario storage unit 13. Further, the correspondence stored in the test information storage unit 11 can also be set by the operation unit 16.

As illustrated in FIGS. 3 to 5 and 7, the test control unit 14 displays, on the display unit 15, a path image showing a correspondence stored in the test information storage unit 11 in response to an operation via the operation unit 16. In addition, in FIGS. 3 to 5 and 7, FIGS. 3A to 5A and 7A show the frequency of each CC, and FIGS. 3B to 5B and 7B show an example of a path image.

In FIGS. 3 to 5 and 7, the path image includes a first area 31 in which information indicating a plurality of CCs is displayed, a second area 32 in which information indicating a plurality of signal processing units 12 is displayed, a third area 33 in which information indicating the correspondence between the plurality of CCs and the plurality of signal processing units 12 is displayed, and a fourth area 34 for distinguishing a port used among the plurality of ports of each signal processing unit 12 from other ports.

In the first area 31, as information indicating a plurality of CCs, first-type figures of the number obtained by multiplying the number of CCs by the number of antennas for each CC are displayed. In the second area 32, as information indicating the plurality of signal processing units 12, second-type figures respectively corresponding to the plurality of signal processing units 12 are displayed.

In the third area 33, line segments connecting the first-type figures and the second-type figures are displayed as information indicating the correspondence between the plurality of CCs and the plurality of signal processing units 12. The test control unit 14 may display the line segments in different display modes (color, line type, thickness, or a combination of these) for respective CCs in order to improve the visibility of the line segments connecting the first-type figures and the second-type figures. In the fourth area 34, third-type figures simulating the ports 20a to 20c shown in FIG. 2 are displayed, and the second-type figures and the third-type figures are associated with each other by arrows.

Figure 3A:
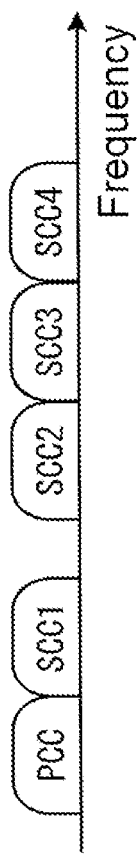
FIGS. 3A and 3B are diagrams for explaining a first example of a path image displayed on a display unit constituting the mobile terminal test apparatus according to the embodiment of the present invention.
Figure 3B:
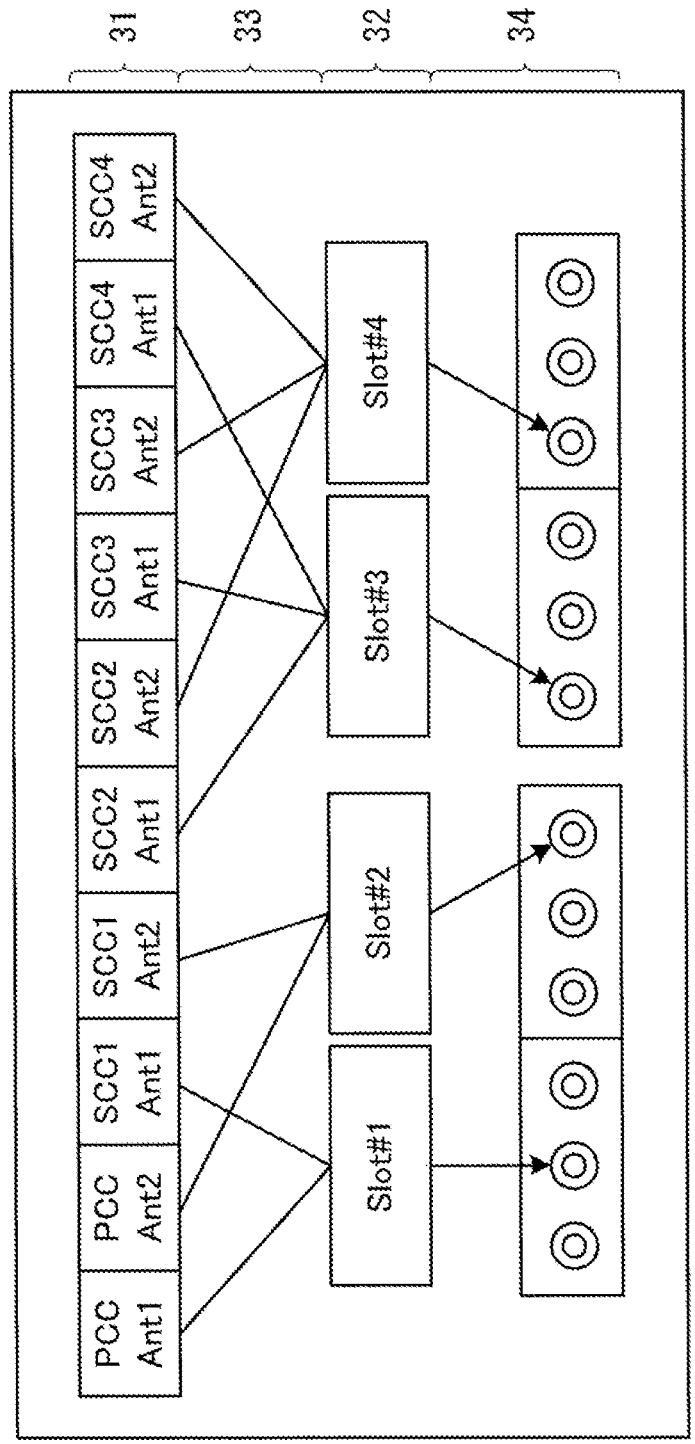

FIGS. 3A and 3B show an example of a path image when it is set such that PCC and SCC1 with continuous frequency bands and SCC2, SCC3 and SCC4 with continuous frequency bands separated from SCC1 are transmitted from two antennas on the transmitting side ("Ant1" and "Ant2" in FIGS. 3A and 3B) to two antennas on the receiving side.

The signal processing unit 12a ("Slot #1" in FIGS. 3A and 3B) is associated with Ant1 of PCC and SCC1, and the signal processing unit 12b ("Slot #2" in FIGS. 3A and 3B) is associated with Ant2 of PCC and SCC1.

Further, since the frequency bandwidth of the signal generator built in each signal processing unit 12 is limited, it is preferable that CCs with continuous frequency bands are processed by the same signal processing unit 12, and CCs with separated frequency bands are processed by the same signal processing unit 12.

Therefore, the signal processing unit 12c ("Slot #3" in FIGS. 3A and 3B) is associated with Ant1 of SCC2, SCC3, and SCC4, and the signal processing unit 12d ("Slot #4" in FIGS. 3A and 3B) is associated with Ant2 of SCC2, SCC3, and SCC4.

As described above, in the example shown in FIGS. 3A and 3B, the signals of Ant1 of the PCC and SCC1 are combined by the signal processing unit 12a and output from the port 20b of the signal processing unit 12a. The signals of Ant2 of the PCC and SCC1 are combined by the signal processing unit 12b and output from the port 20a of the signal processing unit 12b.

Further, the signals of Ant1 of SCC2, SCC3, and SCC4 are combined by the signal processing unit 12c and output from the port 20c of the signal processing unit 12c. The signals of Ant2 of SCC2, SCC3, and SCC4 are combined by the signal processing unit 12d and output from the port 20c of the signal processing unit 12d.

Figure 4A:
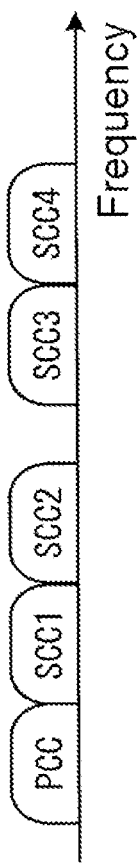
FIGS. 4A and 4B are diagrams for explaining a second example of a path image displayed on a display unit constituting the mobile terminal test apparatus according to the embodiment of the present invention.
Figure 4B:
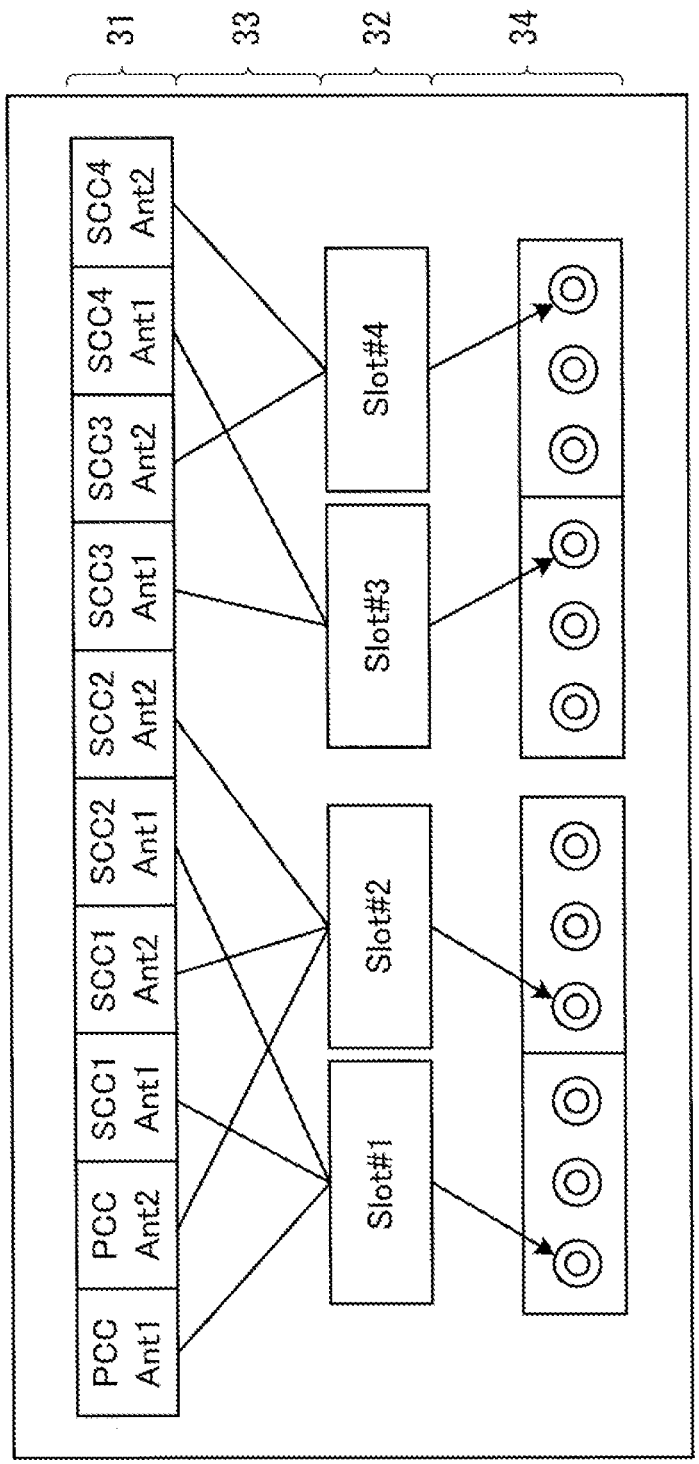

FIGS. 4A and 4B show an example of a path image when it is set such that PCC, SCC1, and SCC2 with continuous frequency bands, and SCC3 and SCC4 with continuous frequency bands separated from SCC1 are transmitted from two antennas on the transmitting side ("Ant1" and "Ant2" in FIGS. 4A and 4B) to two antennas on the receiving side.

The signal processing unit 12a ("Slot #1" in FIGS. 4A and 4B) is associated with Ant1 of PCC, SCC1, and SCC2, and the signal processing unit 12b ("Slot #2" in FIGS. 4A and 4B) is associated with Ant2 of PCC, SCC1, and SCC2.

The signal processing unit 12c ("Slot #3" in FIGS. 4A and 4B) is associated with Ant1 of SCC3 and SCC4, and the signal processing unit 12d ("Slot #4" in FIGS. 4A and 4B) is associated with Ant2 of SCC3 and SCC4.

As described above, in the example shown in FIGS. 4A and 4B, the signals of Ant1 of the PCC, SCC1, and SCC2 are combined by the signal processing unit 12a and output from the port 20c of the signal processing unit 12a. The signals of Ant2 of PCC, SCC1, and SCC2 are combined by the signal processing unit 12b, and output from the port 20c of the signal processing unit 12b.

Further, the signals of Ant1 of SCC3 and SCC4 are combined by the signal processing unit 12c and output from the port 20a of the signal processing unit 12c. The signals of Ant2 of SCC3 and SCC4 are combined by the signal processing unit 12d and output from the port 20a of the signal processing unit 12d.

Figure 5A:
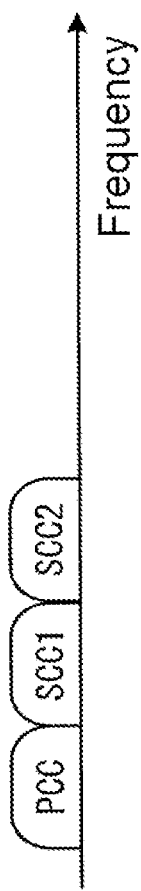
FIGS. 5A and 5B are diagrams for explaining a third example of a path image displayed on a display unit constituting the mobile terminal test apparatus according to the embodiment of the present invention.
Figure 5B:
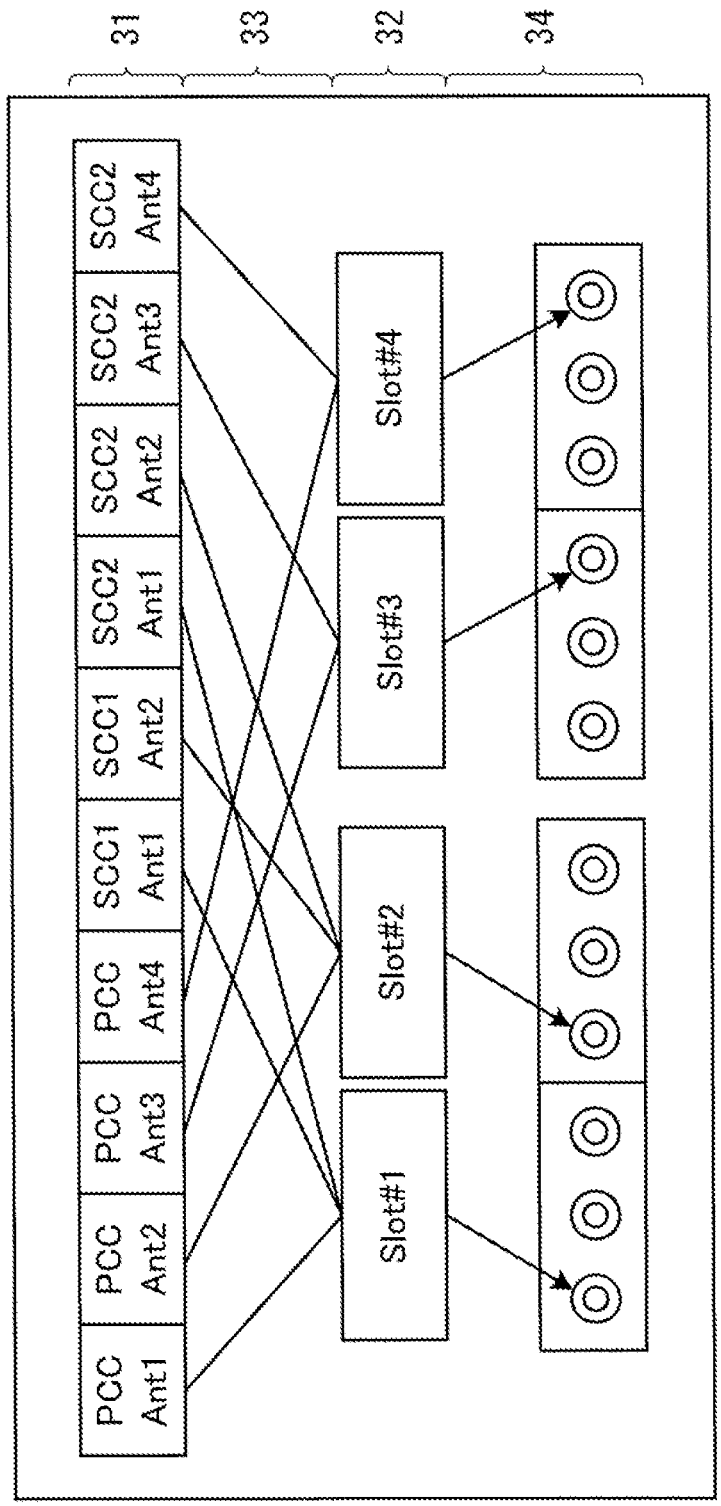

FIGS. 5A and 5B show an example of a path image when it is set such that PCC, SCC1, and SCC2 with continuous frequency bands are transmitted from four antennas on the transmitting side ("Ant1", "Ant2", "Ant3", and "Ant4" in FIGS. 5A and 5B) to four antennas on the receiving side.

The signal processing unit 12a ("Slot #1" in FIGS. 5A and 5B) is associated with Ant1 of PCC, SCC1, and SCC2, and the signal processing unit 12b ("Slot #2" in FIGS. 5A and 5B) is associated with Ant2 of PCC, SCC1, and SCC2.

Further, the signal processing unit 12c ("Slot #3" in FIGS. 5A and 5B) is associated with Ant3 of PCC and SCC2, and the signal processing unit 12d ("Slot #4" in FIGS. 5A and 5B) is associated with Ant4 of PCC and SCC2.

As described above, in the example shown in FIGS. 5A and 5B, the signals of Ant1 of the PCC, SCC1, and SCC2 are combined by the signal processing unit 12a and output from the port 20c of the signal processing unit 12a. The signals of Ant2 of PCC, SCC1, and SCC2 are combined by the signal processing unit 12b, and output from the port 20c of the signal processing unit 12b.

Further, the signals of Ant3 of PCC and SCC2 are combined by the signal processing unit 12c and output from the port 20a of the signal processing unit 12c. The signals of Ant4 of PCC and SCC2 are combined by the signal processing unit 12d and output from the port 20a of the signal processing unit 12d.

Figure 6:
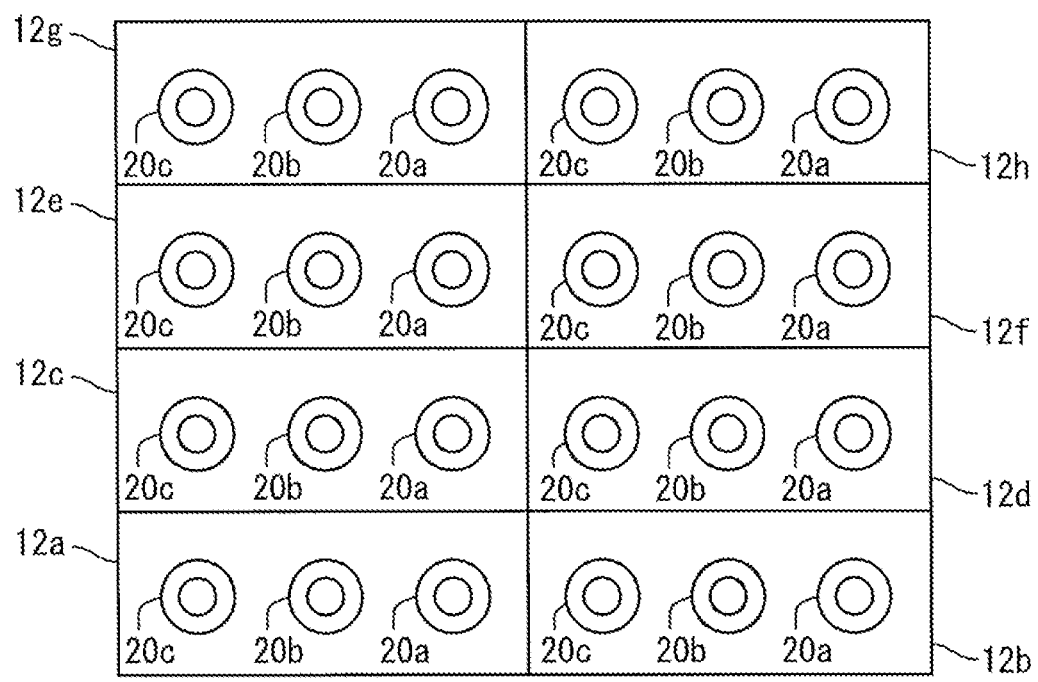
FIG. 6 is a schematic view showing a second example of a port of a signal processing unit constituting the mobile terminal test apparatus according to the embodiment of the present invention.
Figure 7A:
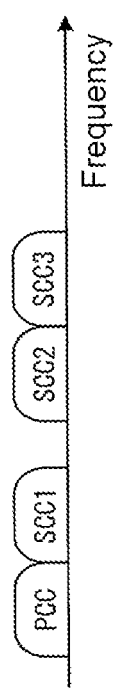
FIGS. 7A and 7B are diagrams for explaining a fourth example of a path image displayed on a display unit constituting the mobile terminal test apparatus according to the embodiment of the present invention.
Figure 7B:
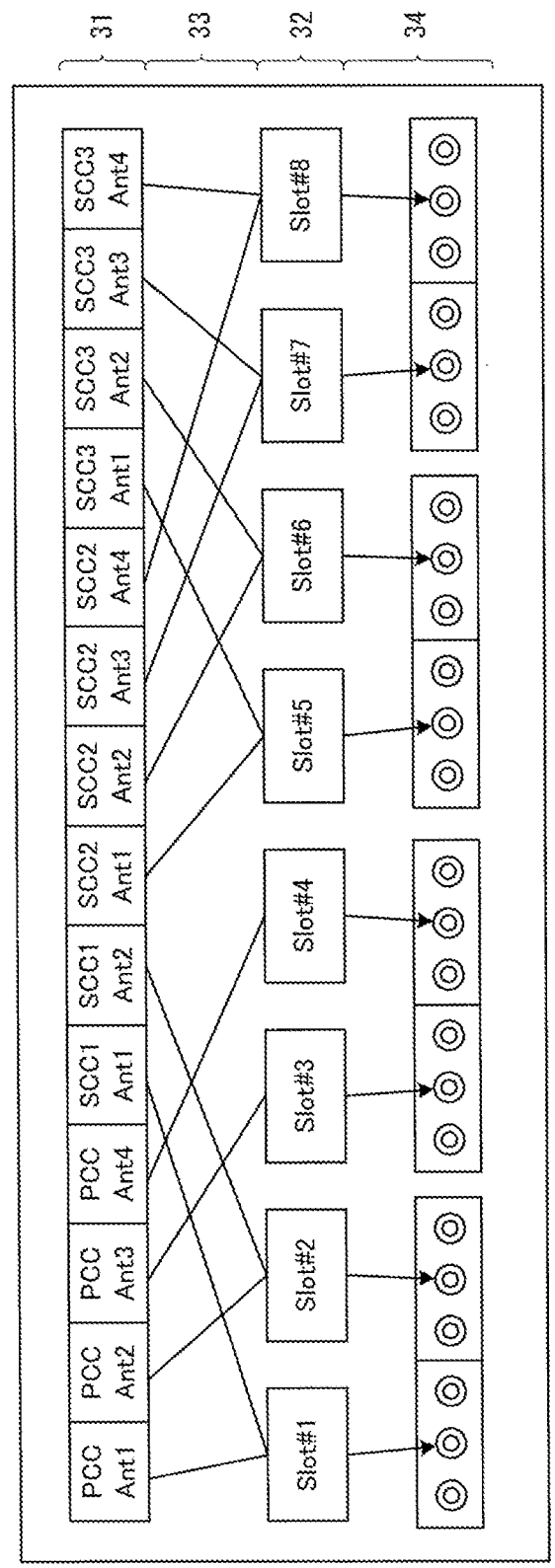

FIG. 6 shows an example in which the mobile terminal test apparatus 1 is provided with eight signal processing units 12a to 12h. FIGS. 7A and 7B show an example of a path image when the signal processing units 12a to 12h are provided in the mobile terminal test apparatus 1, it is set such that PCC and SCC1 with continuous frequency bands, and SCC2 and SCC3 with continuous frequency bands separated from SCC1 are transmitted from four antennas ("Ant1", "Ant2", "Ant3", and "Ant4" in FIGS. 7A and 7B) on the transmitting side to four antennas on the receiving side. The path image shown in FIGS. 7A and 7B shows that a combination of two MIMO systems is set.

The signal processing unit 12a ("Slot #1" in FIGS. 7A and 7B) is associated with Ant1 of PCC and SCC1, and the signal processing unit 12b ("Slot #2" in FIGS. 7A and 7B) is associated with Ant2 of PCC and SCC1.

Further, the signal processing unit 12c ("Slot #3" in FIGS. 7A and 7B) is associated with Ant3 of PCC, and the signal processing unit 12d ("Slot #4" in FIGS. 7A and 7B) is associated with Ant4 of PCC.

The signal processing unit 12e ("Slot #5" in FIGS. 7A and 7B) is associated with Ant1 of SCC2 and SCC3, and the signal processing unit 12f ("Slot #6" in FIGS. 7A and 7B) is associated with Ant2 of SCC2 and SCC3.

Further, the signal processing unit 12g ("Slot #7" in FIGS. 7A and 7B) is associated with Ant3 of SCC2 and SCC3, and the signal processing unit 12h ("Slot #8" in FIGS. 7A and 7B) is associated with Ant4 of SCC2 and SCC3.

As described above, in the example shown in FIGS. 7A and 7B, the signals of Ant1 of the PCC and SCC1 are combined by the signal processing unit 12a and output from the port 20b of the signal processing unit 12a. The signals of Ant2 of the PCC and SCC1 are combined by the signal processing unit 12b and output from the port 20b of the signal processing unit 12b. The signal of Ant3 of the PCC is output from the port 20b of the signal processing unit 12c. The signal of Ant4 of the PCC is output from the port 20b of the signal processing unit 12d.

Further, the signals of Ant1 of SCC2 and SCC3 are combined by the signal processing unit 12e and output from the port 20b of the signal processing unit 12e. The signals of Ant2 of SCC2 and SCC3 are combined by the signal processing unit 12f and output from the port 20b of the signal processing unit 12f.

Further, the signals of Ant3 of SCC2 and SCC3 are combined by the signal processing unit 12g and output from the port 20b of the signal processing unit 12g. The signals of Ant4 of SCC2 and SCC3 are combined by the signal processing unit 12h and output from the port 20b of the signal processing unit 12h.

As described above, in the present embodiment, in order to display the information indicating the correspondence between the plurality of CCs and the plurality of signal processing units 12 on the display unit 15, the correspondence between the plurality of CCs and the plurality of signal processing units 12 can be visualized.

Further, in the present embodiment, since the information indicating the correspondence between the antenna for each CC and the plurality of signal processing units 12 is displayed on the display unit 15, the correspondence between the antenna for each CC and the plurality of signal processing units 12 can be visualized.

Further, in the present embodiment, since information indicating the correspondence between the plurality of CCs and the ports 20a to 20c of the plurality of signal processing units 12 is displayed on the display unit, the correspondence between the plurality of CCs and the ports 20a to 20c of the plurality of signal processing units 12 can be visualized.

Figure 8:
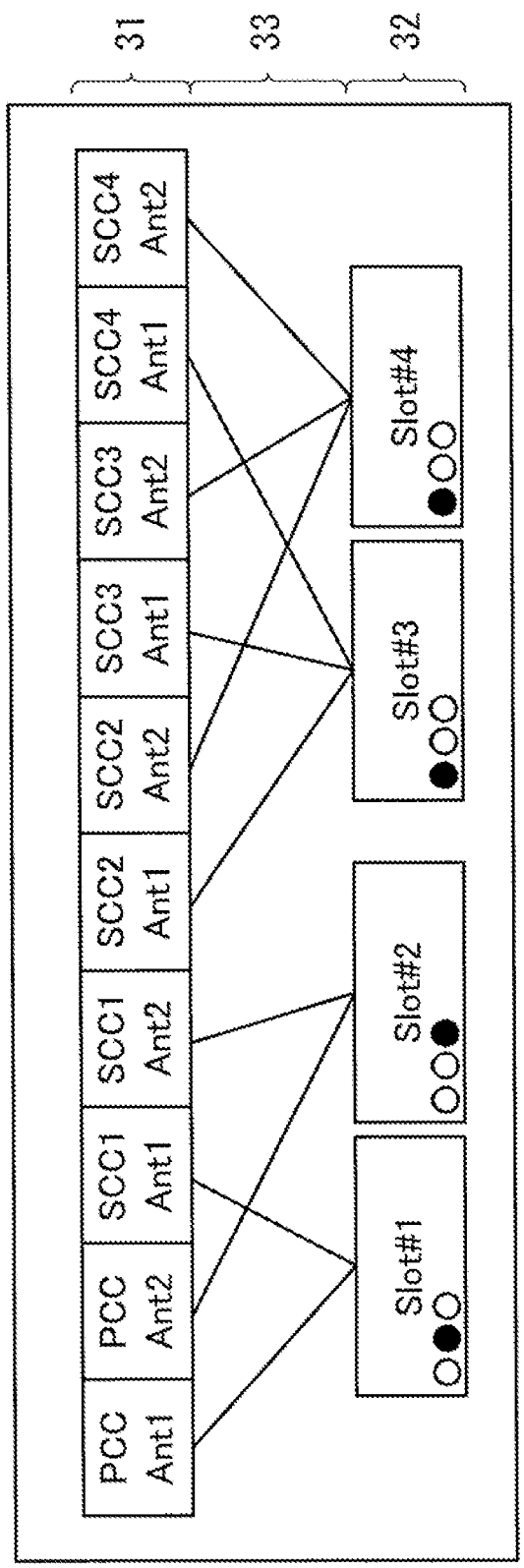
FIG. 8 is a diagram showing a fifth example of a path image displayed on a display unit constituting the mobile terminal test apparatus according to the embodiment of the present invention.

In the third area 33 of the path image shown in FIGS. 3 to 5 and 7, the fourth area 34 may not be included in the path image, for example, as shown in FIG. 8 as long as a port used among the plurality of ports of each signal processing unit 12 can be distinguished from other ports.

Further, the test control unit 14 displays, on the display unit 15, a path image having shown in FIGS. 3A and 3B or the like to check the correspondence between the plurality of CCs, the plurality of signal processing units 12, and the plurality of ports of each signal processing unit 12, but the correspondence stored in the test information storage unit 11 may be updated by drawing or deleting line segments connecting the first-type figures and the second-type figures and an arrow for associating the second-type figures with the third-type figures, via the operation unit 16.

Further, the mobile terminal test apparatus 1 in the present embodiment may be configured to be connected to a general-purpose computer apparatus including a CPU, a RAM, a ROM, a flash memory, a hard disk device, and a communication module.

Figure 9:
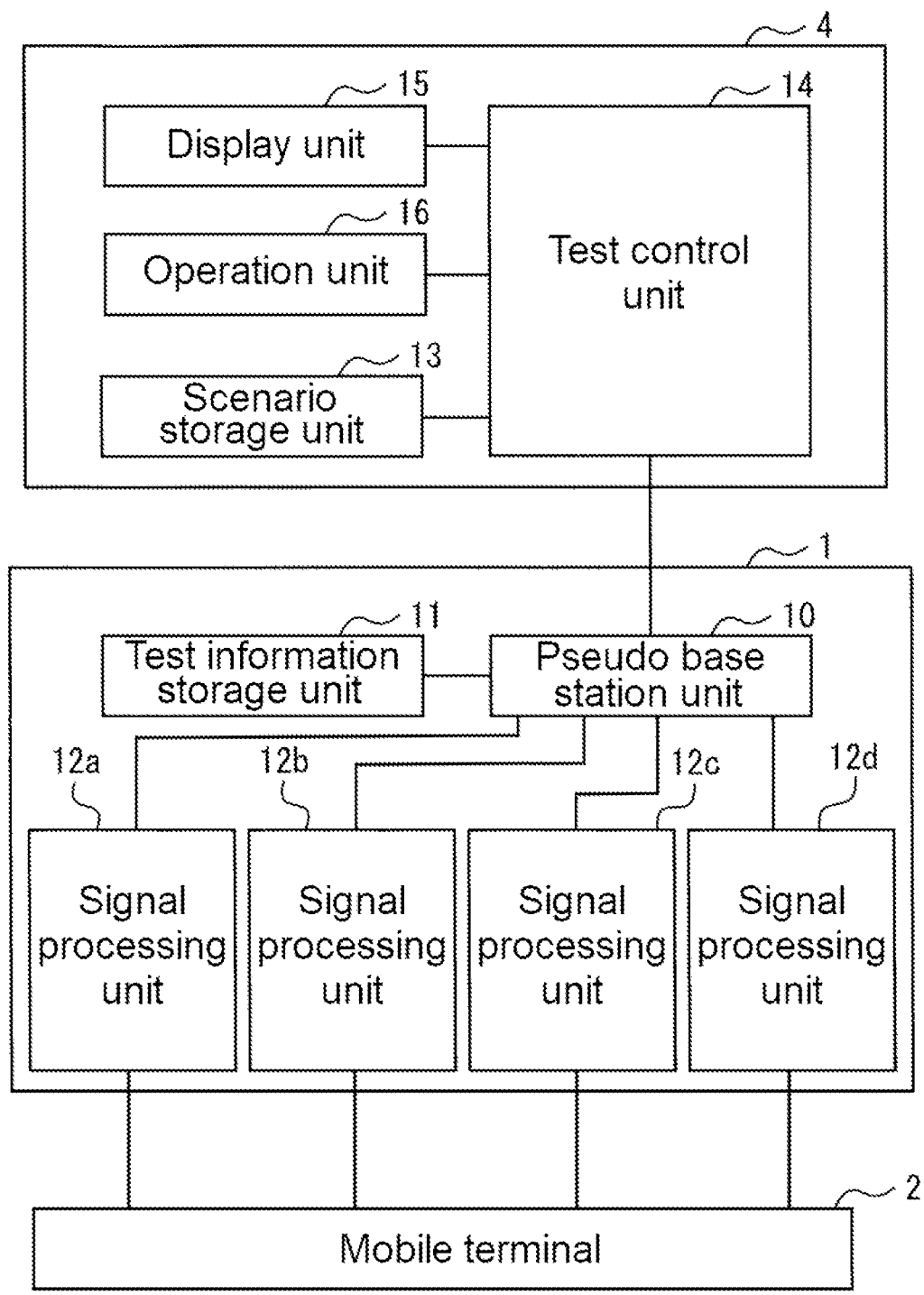
FIG. 9 is a block diagram of a mobile terminal test system according to a modification example of the embodiment of the present invention.

In this case, as shown in FIG. 9, the test control apparatus 4 including the scenario storage unit 13, the test control unit 14, the display unit 15, and the operation unit 16 is composed of a general-purpose computer apparatus, and the mobile terminal test system may be configured by the mobile terminal test apparatus 1 and the test control apparatus 4 excluding the scenario storage unit 13, the test control unit 14, the display unit 15, and the operation unit 16.

Although the embodiments of the present invention have been disclosed above, it is easy to make changes to the present embodiment without departing from the scope of the present invention. Embodiments of the present invention are disclosed on the premise that the equivalent with such modifications is included in the invention described in the claims.

DESCRIPTION OF REFERENCE NUMERALS AND SIGNS

1 Mobile terminal test apparatus
2 Mobile terminal
4 Test control apparatus
10 Pseudo base station unit
12, 12a to 12h Signal processing unit
14 Test control unit
15 Display unit
20a to 20c Port

What is claimed is:

1. A mobile terminal test apparatus comprising:
a plurality of signal processing units that process signals for communication with a mobile terminal;
a pseudo base station unit that functions as a base station for the mobile terminal;
a test control unit that controls the pseudo base station unit; and
a display unit,
the mobile terminal test apparatus testing the mobile terminal by using signals input or output from the plurality of signal processing units by associating a plurality of component carriers with the plurality of signal processing units, based on parameters which are set for each of the plurality of component carriers in carrier aggregation, wherein:
the test control unit displays, on the display unit, a path image having:
a first area in which information indicating the plurality of component carriers is displayed,
a second area in which information indicating the plurality of signal processing units is displayed,
a third area in which information indicating a correspondence between the plurality of component carriers displayed in the first area and the plurality of signal processing units displayed in the second area is displayed, and
a fourth area in which information indicating a correspondence between each of aggregated component carriers and one port among a plurality of ports of the plurality of signal processing units is displayed.

2. The mobile terminal test apparatus according to claim 1, wherein
the test control unit
displays, in the first area, as the information indicating the plurality of component carriers, first-type figures of the number obtained by multiplying the number of component carriers according to a carrier aggregation standard by the number of antennas for each component carrier,
displays, in the second area, as the information indicating the plurality of signal processing units, second-type figures respectively corresponding to the plurality of signal processing units, and
displays, in the third area, as the information indicating the correspondence between the plurality of component carriers displayed in the first area and the plurality of signal processing units displayed in the second area, line segments connecting the first-type figures and the second-type figures.

3. The mobile terminal test apparatus according to claim 1, wherein
the plurality of signal processing units each have a plurality of ports, and the test control unit displays the path image such that a port used among the plurality of ports is distinguished from other ports.

4. A mobile terminal test system comprising:
a mobile terminal test apparatus which includes:
  a plurality of signal processing units that process signals for communication with a mobile terminal; and
  a pseudo base station unit that functions as a base station for the mobile terminal, and
  tests the mobile terminal by using signals input or output from the plurality of signal processing units, by associating a plurality of component carriers with the plurality of signal processing units, based on parameters which are set for each of the plurality of component carriers in carrier aggregation; and
a test control apparatus which controls the mobile terminal test apparatus, wherein
the test control apparatus includes:
  a test control unit that controls the pseudo base station unit, and
  a display unit, and
the test control unit displays, on the display unit, a path image having:
  a first area in which information indicating the plurality of component carriers is displayed,
  a second area in which information indicating the plurality of signal processing units is displayed,
  a third area in which information indicating a correspondence between the plurality of component carriers displayed in the first area and the plurality of signal processing units displayed in the second area is displayed, and
  a fourth area in which information indicating a correspondence between each of aggregated component carriers and one port among a plurality of ports of the plurality of signal processing units is displayed.

5. A control method for a mobile terminal test apparatus which includes a plurality of signal processing units that process signals for communication with a mobile terminal, a pseudo base station unit that functions as a base station for the mobile terminal, a test control unit that controls the pseudo base station unit, and a display unit, and tests the mobile terminal by using signals input or output from the plurality of signal processing units by associating a plurality of component carriers with the plurality of signal processing units, based on parameters which are set for each of the plurality of component carriers in carrier aggregation, the method comprising:
causing the test control unit to display, on the display unit, a path image having:
  a first area in which information indicating the plurality of component carriers is displayed,
  a second area in which information indicating the plurality of signal processing units is displayed,
  a third area in which information indicating a correspondence between the plurality of component carriers displayed in the first area and the plurality of signal processing units displayed in the second area is displayed, and
  a fourth area in which information indicating a correspondence between each of aggregated component carriers and one port among a plurality of ports of the plurality of signal processing units is displayed.

6. The control method for a mobile terminal test apparatus according to claim 5, wherein
the test control unit
  displays, in the first area, as the information indicating the plurality of component carriers, first-type figures of the number obtained by multiplying the number of component carriers according to a carrier aggregation standard by the number of antennas for each component carrier,
  displays, in the second area, as the information indicating the plurality of signal processing units, second-type figures respectively corresponding to the plurality of signal processing units, and
  displays, in the third area, as the information indicating the correspondence between the plurality of component carriers displayed in the first area and the plurality of signal processing units displayed in the second area, line segments connecting the first-type figures and the second-type figures.

7. The control method for a mobile terminal test apparatus according to claim 5, wherein
the plurality of signal processing units each have a plurality of ports, and
the test control unit displays the path image such that a port used among the plurality of ports is distinguished from other ports.

\* \* \* \* \*